United States Patent
Shah

(10) Patent No.: US 8,010,809 B1
(45) Date of Patent: Aug. 30, 2011

(54) METHOD AND SYSTEM FOR SECURING NETWORK DATA

(75) Inventor: Shishir Shah, Irvine, CA (US)

(73) Assignee: QLOGIC, Corporation, Aliso Viejo, CA (US)

(*) Notice: Subject to any disclaimer, the term of this patent is extended or adjusted under 35 U.S.C. 154(b) by 914 days.

(21) Appl. No.: 11/965,037

(22) Filed: Dec. 27, 2007

Related U.S. Application Data

(60) Provisional application No. 60/945,822, filed on Jun. 22, 2007.

(51) Int. Cl.
*H04L 9/08* (2006.01)

(52) U.S. Cl. ........... 713/193; 380/44; 380/281; 380/284

(58) Field of Classification Search ............... 380/281, 380/284, 44; 713/193
See application file for complete search history.

(56) References Cited

U.S. PATENT DOCUMENTS

| | | | |
|---|---|---|---|
| 4,683,968 A | 8/1987 | Appelbaum et al. | |
| 6,263,435 B1 | 7/2001 | Dondeti et al. | |
| 6,460,137 B1 | 10/2002 | Akiyama et al. | |
| 6,598,161 B1 | 7/2003 | Kluttz | |
| 6,658,566 B1 * | 12/2003 | Hazard | 713/172 |
| 7,460,672 B2 * | 12/2008 | Klein | 380/278 |
| 7,643,476 B2 * | 1/2010 | Frank et al. | 370/381 |
| 2002/0091935 A1 * | 7/2002 | Smith et al. | 713/189 |
| 2003/0056108 A1 * | 3/2003 | Mont et al. | 713/193 |
| 2003/0105830 A1 * | 6/2003 | Pham et al. | 709/216 |
| 2003/0177379 A1 * | 9/2003 | Hori et al. | 713/193 |
| 2006/0029069 A1 * | 2/2006 | Frank et al. | 370/389 |
| 2006/0126850 A1 * | 6/2006 | Dawson et al. | 380/284 |
| 2006/0195704 A1 * | 8/2006 | Cochran et al. | 713/193 |
| 2006/0218412 A1 * | 9/2006 | Hars et al. | 713/193 |
| 2006/0236129 A1 * | 10/2006 | Mimatsu | 713/193 |
| 2006/0288426 A1 | 12/2006 | Saito | |
| 2007/0143611 A1 * | 6/2007 | Arroyo et al. | 713/171 |
| 2007/0226412 A1 * | 9/2007 | Morino et al. | 711/113 |

* cited by examiner

*Primary Examiner* — Ponnoreay Pich
(74) *Attorney, Agent, or Firm* — Klein, O'Neill & Singh, LLP

(57) ABSTRACT

Method and system for storing data in a storage device accessible through a storage area network is provided. The method includes receiving data from a host system; generating a first encryption key for encrypting data information that describes the received data; generating a second encryption key that encrypts the first encryption key and the encrypted data information; generating an encryption packet that includes the second encryption key, the first encryption key and the data information; storing the encryption packet at one or more memory locations; and periodically refreshing the encryption packet without periodically encrypting the received data for securely storing the received data.

12 Claims, 4 Drawing Sheets

US 8,010,809 B1

METHOD AND SYSTEM FOR SECURING NETWORK DATA

CROSS-REFERENCE TO RELATED APPLICATIONS

This patent application claims priority provisional patent application Ser. No. 60/945,822 on Jun. 22, 2007, the disclosure of which is incorporated herein by reference in its entirety.

TECHNICAL FIELD

The present description relates to network systems, and more particularly, to securing stored data.

RELATED ART

Computer networking is commonplace and is used for storing and accessing information (or data). Typically, networks use computers, network devices (for example, network cards, switches, routers and others) and storage devices so that users can store and access information regardless of physical location. Network computing has increased the use of mass storage devices that can store data. Computers communicate with storage devices (e.g., disks and disk arrays) and with other computers using network connections such as Ethernet, Fibre Channel, SCSI, iSCSI and Infiniband.

Network connections use various standard protocols (Fibre Channel, InfiniBand, Serial Attached SCSI (SCSI) and others) to transfer data, commands and status information between computers and storage devices. Data stored at a storage device or transmitted to other storage devices is often of proprietary nature. It is desirable to secure such proprietary data from unauthorized access.

One way of securing data is by encrypting the data. Data encryption is a means of scrambling data so that person(s) holding a "key" (encryption key) for unscrambling the encrypted data can only read it. The key is randomly generated from a variety of possible key variations (also referred to as "random number generation") and is used to access the encrypted data. Storage area networks (SANs) typically use an encryption device for generating encryption keys.

Encryption keys are changed periodically for enhanced security. This requires re-encrypting the stored data. However, periodical re-encryption of data is cumbersome especially where large amount of data has to be re-encrypted. Another shortcoming of this approach if the encryption device fails, the key and data information may be lost; and hence data may no longer be protected.

Continuous efforts are being made to improve data security with minimal impact to overall network performance.

SUMMARY

In one embodiment, a method for storing data in a storage device accessible through a storage area network is provided. The method includes receiving data from a host system; generating a first encryption key for encrypting data information that describes the received data; generating a second encryption key that encrypts the first encryption key and the encrypted data information; generating an encryption packet that includes the second encryption key, the first encryption key and the data information; storing the encryption packet at one or more memory locations; and periodically refreshing the encryption packet without periodically encrypting the received data for securely storing the received data.

In another embodiment, a system for securely storing data is provided. The system includes a host system for writing and reading data from a storage device that is accessible through a storage area network; an encryption device that receives data from the host system and (a) generates a first encryption key for encrypting data information that describes the data received from the host system; (b) generates a second encryption key that encrypts the first encryption key and the data information; and generates an encryption packet that includes the second encryption key, the first encryption key and the data information; wherein the encryption packet is stored in a memory for the encryption device; and the encryption device periodically refreshes the encryption packet without periodically encrypting the received data for securely storing the received data and a storage controller that interfaces with at least one storage device and the encryption device; and also stores a copy of the encryption packet.

In yet another embodiment, an encryption device is provided. The encryption device includes an interface for receiving data from a host system for storing the received data in a storage device accessible via a storage area network; and a key generator module that (a) generates first encryption key for data information that describes the data received from the host system; (b) generates second encryption key that encrypts the first encryption key and the data information; and (d) generates an encryption packet that includes the second encryption key, the first encryption key and the data information; and the encryption packet is stored in a memory for the encryption device; wherein the encryption device periodically refreshes the encryption packet without periodically encrypting the received data for securely storing the received data.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

To facilitate an understanding of the adaptive aspects of the present description, the general architecture and operation of a network system using an encryption device is described. The specific architecture and operation of the adaptive aspects of the present disclosure are then described with reference to the general architecture.

Various network protocols and standards are used to facilitate network communication. For example, Fibre Channel, InfiniBand, Ethernet, Fibre Channel over Ethernet (FCOE) and others. These standards are briefly described below.

Fibre Channel: Fibre Channel is a set of American National Standards Institute (ANSI) standards, which provide a serial transmission protocol for storage and network protocols such as HIPPI, SCSI, IP, ATM and others. Fibre Channel supports three different topologies: point-to-point, arbitrated loop and Fabric. The point-to-point topology attaches two devices directly. The arbitrated loop topology attaches devices in a loop. The Fibre Channel Fabric topology attaches host systems directly to Fabric, which is connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from various ports and routes them to other ports.

Ethernet: Ethernet is another common protocol that is used for network device communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The various embodiments described below may use Ethernet (which includes 100 Base-T and/or Gigabit Ethernet) as the network protocol.

InfiniBand: Infiniband ("IB") is an industry standard for networks comprised of computers and/or input/output (I/O) devices. IB is typically being used in the High Performance Computing (HPC) environment. HPC environments typically create clusters of computers, with high performance characteristics. Large-scale HPC systems often encompass hundreds and even thousands of interconnected computers all working in parallel to solve complex problems.

Fibre Channel Over Ethernet (FCOE): FCOE is an upcoming standard that is being proposed to handle both Ethernet (network) and Fibre Channel (storage) traffic over an Ethernet link. The port assignment described below is applicable to an FCOE port that supports FCOE based communication.

It is noteworthy, that the adaptive embodiments disclosed herein are not limited to any particular protocol, as long as the functional goals are met by an existing or new network protocol.

Figure 1A:
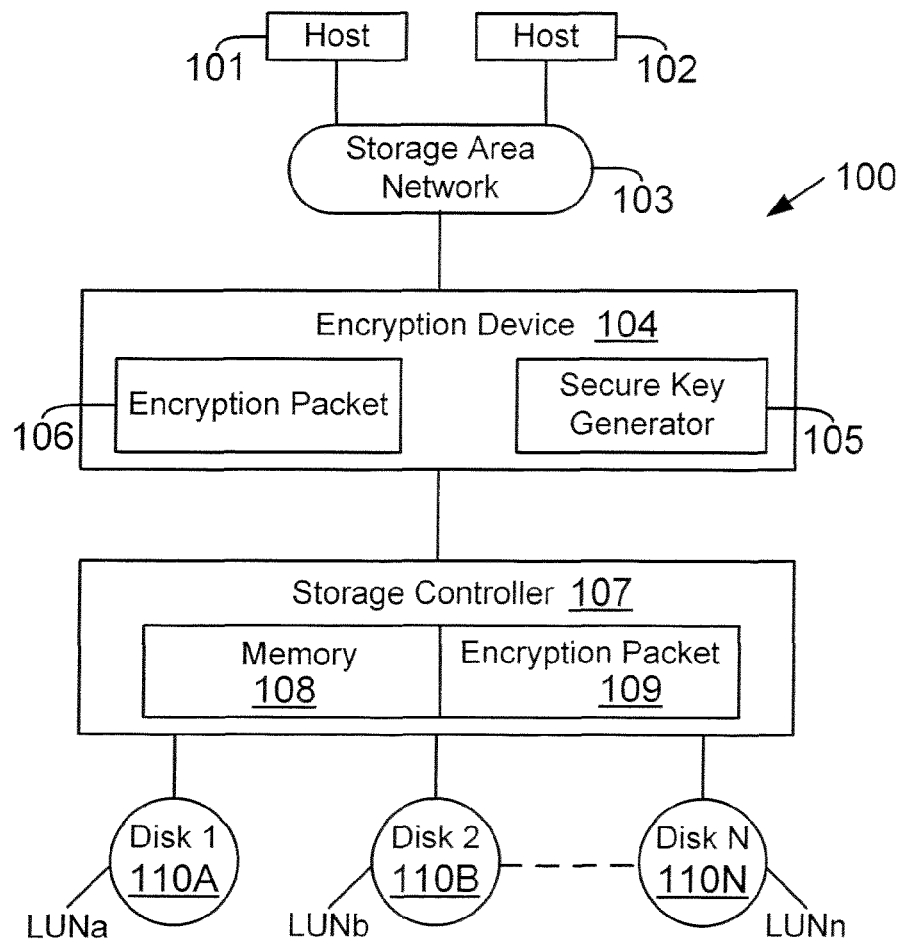
FIG. 1A shows a block diagram of a network system used, according to one embodiment.

Network System:

FIG. 1A shows a block diagram of a system 100, according to one embodiment. In system 100, computing systems (also referred to as a "host" or "host system") 101 and 102 can write and read data to and from various storage devices (shown as disks 110A . . . 110N) via a storage area network (SAN) 103. Storage devices 110A . . . 110N may be described by a logical unit number (LUN) for example, LUNa, LUNb . . . LUNn.

Storage area network 103 is commonly used where plural memory storage devices are made available to various host computing systems. Data in SAN 103 is typically moved from plural host systems (that include computer systems, servers etc.) to a storage system through various controllers/adapters as described below.

A storage controller 107 controls access to plural storage devices 110A . . . 110N. In one aspect of the present description, storage controller 107 may be a redundant array of independent disks ("RAID") controller that controls access to plural storage devices (110A . . . 110N). The present description is not limited to any particular structure or type of storage controller 107.

In conventional systems, host (101, 102) sends data via SAN 103 and encryption device 104 encrypts the entire data and generates an encryption key. The encryption key and the information about the encrypted data (data information) are stored within encryption device 104. If encryption device 104 fails, the encryption key and the data information are lost and the data is no longer protected.

Furthermore, whenever the encryption key is updated and reprogrammed, the stored data (also referred to as data at rest) is re-encrypted. This periodical re-encryption of the entire stored data is cumbersome and inefficient.

The present description overcomes these problems and provides a system and process for securing data that eliminates the need for periodically re-encrypting stored data. The present disclosure also enables saving an encryption key external to encryption device 104. Thus, in case encryption device 104 fails, the encryption key and the data are still secure. This minimizes disruption to overall network performance because a host system can securely access to storage devices.

Figure 1B:
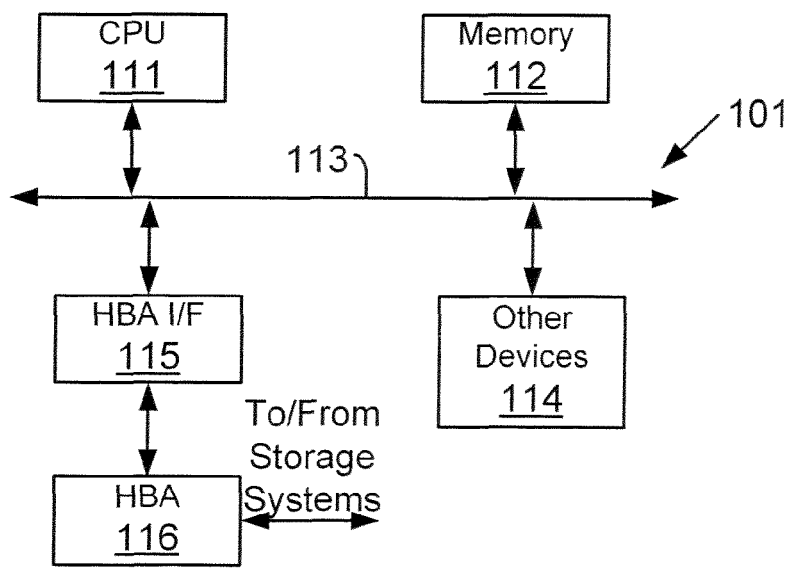
FIG. 1B shows a block diagram of a host system used according to one aspect of the present invention.
Figure 1C:
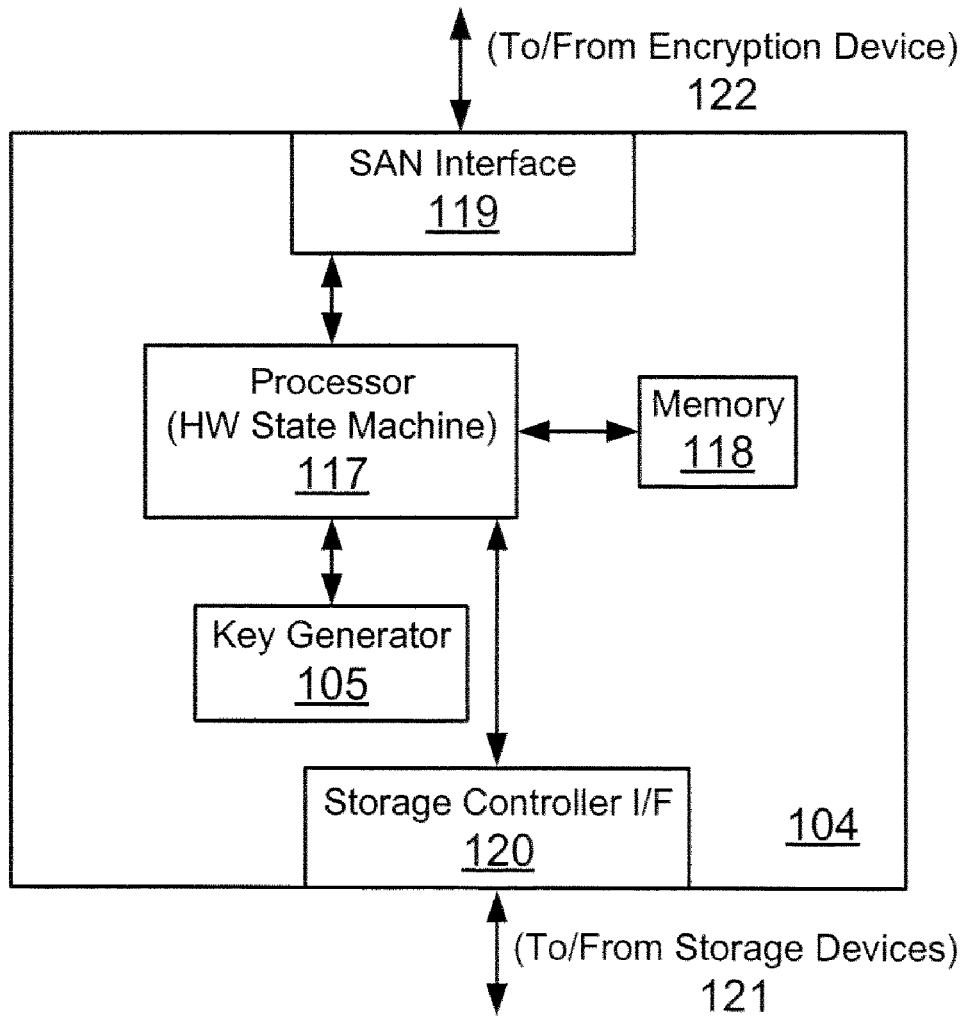
FIG. 1C shows a block diagram of an encryption device, used according to one embodiment.
Figure 1D:
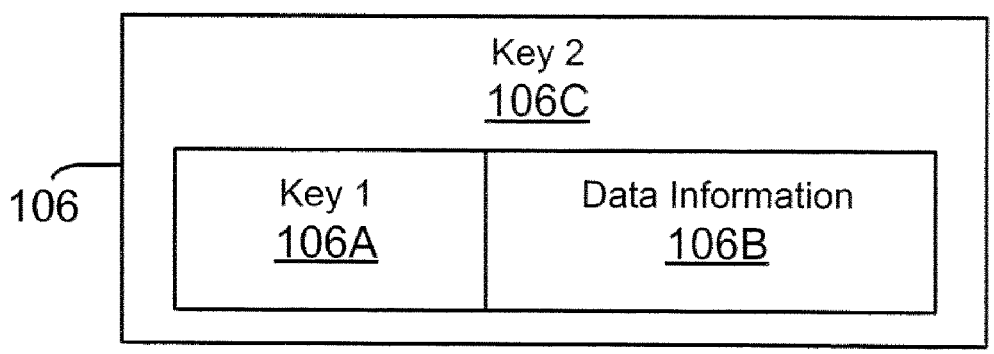
FIG. 1D shows an example of an encryption packet, according to one embodiment.
Figure 1E:
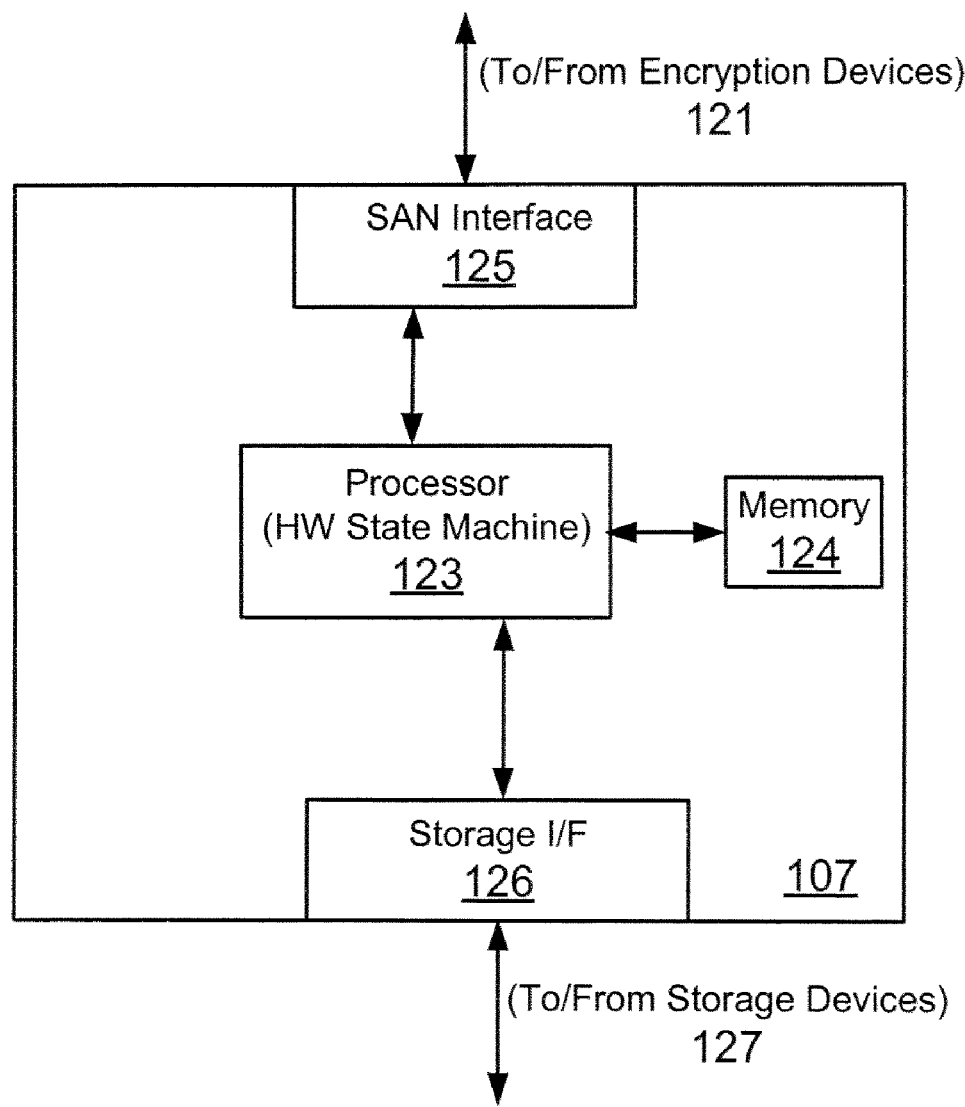
FIG. 1E shows a block diagram of a storage controller, used according to one embodiment.
Figure 2:
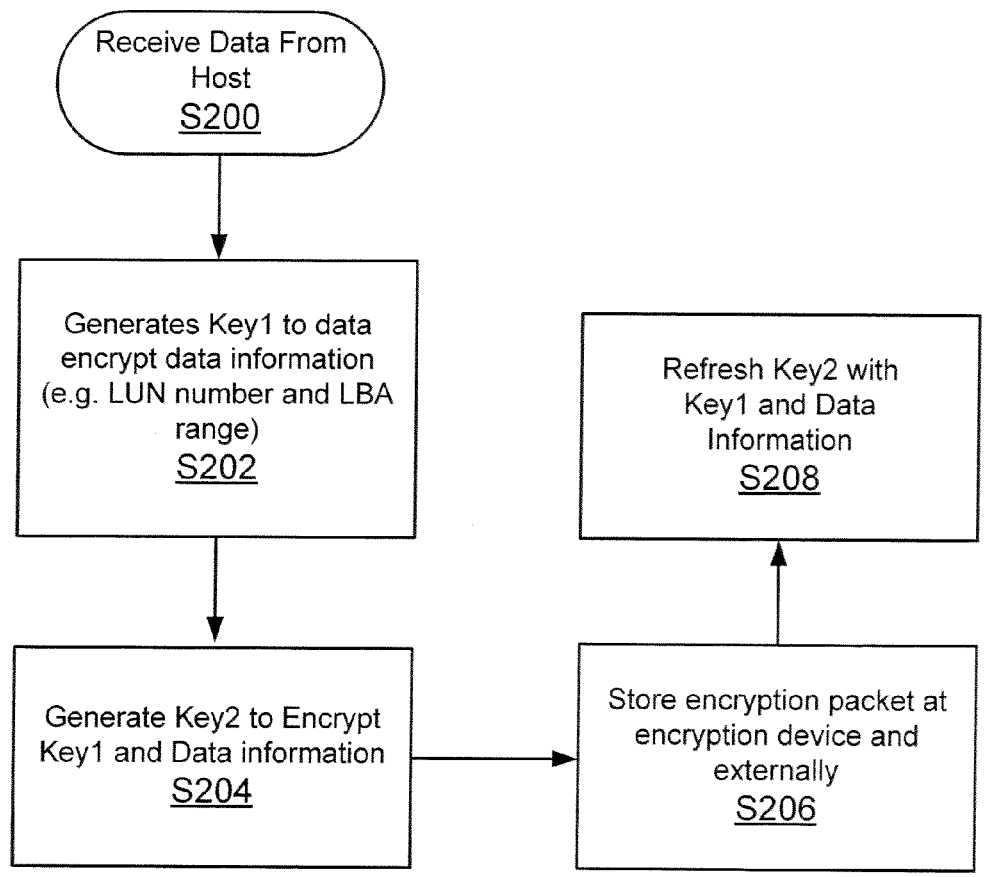
FIG. 2 shows a process flow diagram for securing data, according to one embodiment.

Before describing the encryption process flow of the present disclosure, the following provides a brief description of a host system, an encryption device and a storage controller with respect to FIGS. 1B, 10, 10 and 1E, respectively, as used according one embodiment of the present disclosure.

Host System.

FIG. 1B shows a generic block diagram for host 101. Host system 101 may typically include a host processor 111 (also referred to as a "central processing unit" or "CPU") coupled to computer bus 113 for processing data and instructions. In one embodiment, CPU 111 may be a Pentium® Class microprocessor commercially available from the Intel Corporation or the equivalent. A computer readable volatile memory unit 112, for example, a random access memory (RAM) unit may be coupled with bus 113 for temporarily storing data and instructions for host processor 111 and other systems of host system 101. A computer readable non-volatile memory (not shown), example, read-only memory (ROM) unit, may also be provided for storing non-volatile data and invariant instructions for host processor 111.

Host 101 may also include other devices 114 with the appropriate interfaces. For example, a mouse, keyboard, graphics cards, video cards and others. Host 101 configuration and other devices 114 depend on how Host is used.

Host systems often communicate with storage systems via a controller/adapter known as a host bus adapter ("HBA") 116, using a local bus standard, such as the Peripheral Component Interconnect ("PCI," "PCI-X", or "PCI-Express," all used interchangeably throughout the specification) bus interface. The PCI, PCI-X and PCI-Express standards are all incorporated herein by reference in their entirety. HBA 116 handles input/output (I/O) requests for processor 111. Host 101 interfaces with HBA 116 via HBA interface 115.

QLogic Corporation, the assignee of the present application provides HBAs (116) for host 101. An example of HBA 116 is QLE2462, a 4 Gb, PCI-Express HBA that operates in a Fibre Channel based SAN.

Encryption Device:

FIG. 1C shows a block diagram of encryption device 104, according to one embodiment. Encryption device 104 may include a processor (or hardware state machine) 117 that can execute instructions out of memory 118. Encryption device 104 includes a SAN interface 119 to interface with SAN 103 via link 122; and a storage controller interface 120 to interface with storage controller 107 via link 121. The structure and nature of these interfaces depends on the type of SAN and storage controllers. For example, for a Fibre Channel based SAN 103, SAN interface 119 includes logic for handling Fibre Channel frames. It is noteworthy that the present disclosure is not limited to any particular type of SAN or standard.

Encryption device 104 further includes a secure key generator module (also referred to as key generator 105) 105 that may be used to generate encryption keys, according to one embodiment. Secure key generator module 105 is a functional block and processor 117 may perform key generator 105 operations.

As data comes in from host systems 101 and 102, encryption device 104 encrypts data, generates a first encryption key (Key1) and stores Key1 and data information in memory 108. Each storage device 110A ... 110N (or subsection of storage device) has its own encryption Key1. After Key1 is generated, the system requests generation of another security key from secure key generator 105.

Secure key generator 105 generates a second key (Key 2 OR key2) 106C. Key2 106C encrypts the combination of Key1 106A and the data information 106B. An encryption packet 106 is generated which comprises of Key2, Key 1 and the data information.

Encryption packet 106 may be stored in encryption device 104. Additionally, encryption packet may be stored in memory 108 of storage controller 107 (shown as encryption packet 109). If encryption device 104 fails, the data and the keys (Key1 and Key2) saved in encryption packet 109 enable access to the data at rest.

Further, secure key generator 105 periodically regenerates Key2 106C to secure the data. A user may program how often Key2 106C is regenerated. For periodic re-encryption of data, only Key2 needs to be regenerated Whenever Key2 is regenerated, Key1 and data information is also re-encrypted.

It is noteworthy that data information may include LUN information or logical block address (LBA) information. The term LUN as used throughout this specification means a logical unit number on a Parallel SCSI, Fiber Channel or iSCSI target. LUN is typically a unique identifier used on a SCSI bus to distinguish between devices that share the same bus.

LBA information is commonly used for specifying the location of logical blocks of data stored on computer storage devices, such as hard disks, tape drives and others.

FIG. 1D shows an example of an encryption packet 106. Encryption packet 106 may include key 1 106A and data information 106B. Key 2 106C wraps around key 1 and data information 106D. Data information 106B may include LUN and LBA related information.

Storage Controller:

FIG. 1E shows a block diagram of a storage controller (or RAID controller) 107, used according to one embodiment of the present disclosure. Storage controller 107 includes a processor 123 that executes program instructions out of memory 124. Processor 123 controls overall storage controller 107 operations.

Storage controller 107 includes a SAN interface 125 that is coupled to encryption device 104 for sending and receiving encrypted data via link 121. Storage controller 107 uses storage controller interface 126 for interfacing with a plurality of storage devices (110A-110N) via link 127.

Process Flow:

In another embodiment, a process for encrypting network data is provided. The process starts in step S200, when a host system (101 and/or 102) sends data to disks (110A ... 110N).

In step S202, encryption device 104 generates a first key, Key1, to encrypt data information, such as LUN information and LBA range.

In step S204, secure key generator 105 generates a second Key2 (for example, 106C) to encrypt Key1 example, 106A) and the data information (for example, 106C).

In step S206, Key2, Key1 and the data information are stored as an encryption packet 106 in encryption device 104 and/or at an external device such as storage controller 107 (shown as encryption packet 109, FIG. 1A).

In step S208, secure key generator 105 periodically refreshes Key2 with Key1 and data information.

Although the present description refers to generation of two encryption keys (Key1, Key2), it is within the scope of the present description to generate multiple key(s) for encrypting data.

In one embodiment, the entire data does not have to be encrypted and re-encrypted for secure storage, instead only Key 2 is refreshed with Key 1 and data information. This saves computing resources and improves overall performance of a network for securely storing and reading data from storage devices.

While embodiments of the present description are described above with respect to what is currently considered its preferred embodiments, it is to be understood that the description is not limited to that described above. To the contrary, the description is intended to cover various modifications and equivalent arrangements within the spirit and scope of the specification.

What is claimed is:

1. A method for storing data in a storage device accessible through a storage area network, comprising:
   receiving the data from a host system;
   encrypting the data and storing the encrypted data in the storage device:
   generating a first encryption key for encrypting data information that describes the received data;
   generating a second encryption key that encrypts the first encryption key and the data information;
   generating an encryption packet that includes the second encryption key, the first encryption key and the data information;
   storing the encryption packet at one or more memory locations; and
   periodically regenerating the encryption packet without periodically re-encrypting the encrypted data.

2. The method of claim 1, wherein an encryption device receives the data from the host system.

3. The method of claim 2, wherein a key generator module in the encryption device generates the first encryption key, the second encryption key and the encryption packet.

4. The method of claim 2, wherein the encryption packet is stored in the encryption device and a storage controller.

5. The method of claim 1, wherein the data information includes logical unit information (LUN) and logical block address (LBA) information.

6. A system for securely storing data, comprising:
   a host system for writing and reading the data from a storage device that is accessible through a storage area network;
   an encryption device that receives the data from the host system and (a) encrypts the data; (b) generates a first encryption key for encrypting data information that describes the data received from the host system; (c) generates a second encryption key that encrypts the first encryption key and the data information; and (d) generates an encryption packet that includes the second encryption key, the first encryption key and encrypted data information; wherein the encryption packet is stored in a memory for the encryption device; and the encryption device periodically regenerates the encryption packet without periodically re-encrypting the encrypted data for securely storing the received data and a storage controller that interfaces with at least one storage device and the encryption device to store the encrypted data in the at least one storage device, and also stores a copy of the encryption packet.

7. The system of claim 6, wherein a key generator module in the encryption device generates the first encryption key, the second encryption key and the encryption packet.

8. The system of claim 6, wherein the data information includes logical unit number (LUN) information and logical block address (LBA) information.

9. An encryption device, comprising:

an interface for receiving data from a host system;

a processor for encrypting the data;

a key generator module that (a) generates a first encryption key for encrypting data information that describes the data received from the host system; (b) generates a second encryption key that encrypts the first encryption key and the data information; and (c) generates an encryption packet that includes the second encryption key, the first encryption key and the encrypted data information; and the encryption packet is stored in a memory for the encryption device; wherein the encryption device periodically regenerates the encryption packet without periodically re-encrypting the encrypted data; and a storage controller interface for communicating with a storage controller that controls storage of the encrypted data on one or more storage devices accessible to the host system.

10. The encryption device of claim 9, wherein the encryption packet is also stored in a storage controller that interfaces with at least one storage device and the encryption device.

11. The encryption device of claim 9, wherein the storage area network is a Fibre Channel based system.

12. The encryption device of claim 9, wherein the data information includes logical unit information (LUN) and logical block address (LBA) information.

* * * * *

UNITED STATES PATENT AND TRADEMARK OFFICE
CERTIFICATE OF CORRECTION

| | | |
|---|---|---|
| PATENT NO. | : 8,010,809 B1 | Page 1 of 1 |
| APPLICATION NO. | : 11/965037 | |
| DATED | : August 30, 2011 | |
| INVENTOR(S) | : Shishir Shah | |

It is certified that error appears in the above-identified patent and that said Letters Patent is hereby corrected as shown below:

In column 1, line 7, after "priority" insert -- to the --.

In column 1, line 8, after "60/945,822" insert -- filed --.

In column 4, line 29, delete "System." and insert -- System: --, therefor.

In column 4, line 47, after "Host" insert -- 101 --.

In column 5, line 22, delete "OR" and insert -- or --, therefor.

In column 5, line 35, delete "regenerated" and insert -- regenerated. --, therefor.

In column 5, line 50, delete "1060." and insert -- 106C. --, therefor.

In column 6, line 35, in Claim 1, delete "device:" and insert -- device; --, therefor.

Signed and Sealed this
Fourteenth Day of February, 2012

David J. Kappos
*Director of the United States Patent and Trademark Office*